United States Patent [19]
Jaunarajs et al.

[11] 3,977,890
[45] Aug. 31, 1976

[54] METHOD FOR THE PREPARATION OF FIBROUS CALCIUM SULFATE HEMIHYDRATE

[75] Inventors: Karlis L. Jaunarajs, Denver, Colo.; Julie C. Yang, Lexington, Mass.

[73] Assignee: Johns-Manville Corporation, Denver, Colo.

[22] Filed: Aug. 5, 1974

[21] Appl. No.: 494,425

Related U.S. Application Data

[63] Continuation-in-part of Ser. No. 281,267, Aug. 16, 1972, abandoned.

[52] U.S. Cl. .................................. 106/109; 423/555
[51] Int. Cl.² .......................................... C04B 11/00
[58] Field of Search ............ 423/553, 554, 555, 155, 423/161, 164, 172; 106/110, 109

[56] References Cited
UNITED STATES PATENTS

| | | | |
|---|---|---|---|
| 757,649 | 4/1904 | Brothers | 423/555 |
| 1,901,051 | 3/1933 | Randel et al. | 106/110 X |
| 3,084,027 | 4/1963 | Hollingsworth et al. | 423/555 |
| 3,410,655 | 11/1968 | Rüter et al. | 423/555 |
| 3,822,340 | 7/1974 | Eberl et al. | 423/555 |
| 3,835,219 | 9/1974 | Jaunarajs et al. | 423/555 |

FOREIGN PATENTS OR APPLICATIONS

| | | | |
|---|---|---|---|
| 3,225 | 2/1904 | United Kingdom | 423/172 |
| 26,007 | 6/1904 | United Kingdom | 423/172 |
| 563,019 | 7/1944 | United Kingdom | 423/172 |

OTHER PUBLICATIONS

"Process for Making High Strength Plaster of Paris," Eberl, James J. and Ingram, Alvin R., Industrial and Engineering Chemistry, vol. 41, No. 5, pp. 1061–1065.

*Primary Examiner*—Winston A. Douglas
*Assistant Examiner*—John P. Sheehan
*Attorney, Agent, or Firm*—Robert M. Krone; Joseph J. Kelly; James W. McClain

[57] ABSTRACT

A process is described for the formation of fibrous calcium sulfate hemihydrate, the fibers thereof having specified dimensions, wherein a dilute aqueous suspension of gypsum and, if desired, a crystal habit modifier is first formed. The gypsum in the suspension is then converted into fibrous hemihydrate by reaction in the presence of saturated steam at 120° to 155°C for 0.5 to 2.5 hours.

6 Claims, No Drawings

METHOD FOR THE PREPARATION OF FIBROUS CALCIUM SULFATE HEMIHYDRATE

CROSS-REFERENCE TO RELATED APPLICATION

This application is a continuation-in-part of application Ser. No. 281,267, filed Aug. 16, 1972, and now abandoned.

BACKGROUND OF THE INVENTION

1. Field of the Invention

The invention herein relates to the formation of fibrous calcium sulfate hemihydrate.

Research has been carried on for years on the conversion of gypsum ($CaSO_4 \cdot 2H_2O$) into the various forms of its hemihydrate ($CaSO_4 \cdot 1/2H_2O$), sometimes referred to as plaster of Paris, and its anhydrite ($CaSO_4$). Because of the commercial importance of plaster of Paris as a construction material, most of the emphasis in this research has been upon processes to form hemihydrates having short, broad crystalline structures, for these tend to produce the strongest and most easily worked plasters. In recent years, however, emphasis has shifted from the production of plaster to the use of hemihydrate as reinforcement in other materials, notably organic polymeric matrices. For such usage, short, broad crystals of hemihydrate are unsatisfactory, despite their ability to form high strength plasters. As reinforcements, the fibrous forms of the hemihydrate have been found to be much superior in direct contrast to the respective properties of the two forms in plaster technology. For this reason, it would be desirable to develop processes which would produce high yields of fibrous hemihydrate while minimizing production of nonfibrous hemihydrate and anhydrite from gypsum.

2. Description of Prior Art

There is a wide variety of patents and articles discussing various aspects of hemihydrate formation from gypsum. Typical descriptive articles which describe the hemihydrates and their properties are those by Riddell in the May 1950 issue of *Rock Products*, page 68, and by Bauer in the April 1952 issue of *Pit and Quarry*, page 113. The book *The Chemistry of Cement and Concrete* by Lea describes properties of gypsum and its derivatives on page 18. Various aspects of the formation of hemihydrate by calcination of gypsum at high temperature in the presence of steam under pressure are disclosed in U.S. Pats. Nos. 1,901,051; 1,931,240; 1,941,188; 1,989,712; 2,448,218; 2,460,267; 3,423,172; 3,576,599; and 3,579,300. Hemihydrate crystalline forms are described in U.S. Pats. Nos. 2,616,789 and 3,580,703. Formation of fibrous hemihydrate from high concentration suspensions of gypsum is described in an article by Eberl et al in the May 1949 issue of *Industrial and Engineering Chemistry*, page 1061. Crystal habit modifiers are described in U.S. Pats. Nos. 2,907,668 and 3,520,708.

BRIEF SUMMARY OF THE INVENTION

The invention herein is a novel and specific process for the formation of fibrous calcium sulfate hemihydrate with the fiber thereof having specified dimensions. These fibers have been found to be quite useful for reinforcement of organic polymeric matrices, for use of these fibrous hemihydrates as reinforcing agents substantially increases the strength of polymeric materials. Often the strength of the fibrous hemihydrate reinforced materials is significantly greater than that of similar polymeric materials reinforced by conventional fibrous materials such as asbestos. The process comprises first forming an aqueous suspension of gypsum which is not greater than 0.30 molar in gypsum. The gypsum used is ground or otherwise comminuted to a particular form in which at least 90% of the particles are minus 4 mesh in size. The solution may also contain a crystal habit modifier which is suitable for formation of the fibrous alpha hemihydrate. Following formation of the suspension, the gypsum in the suspension is converted to the fibrous hemihydrate by reaction in a pressure vessel in the presence of saturated steam at a temperature in the range of from 120° to 155°C for a period of 0.5 to 2.5 hours, thereby forming fibers of calcium sulfate hemihydrate having an overall average length in the range of from 30 to 70 microns, individual maximum lengths not exceeding 180 microns, and aspect ratios in the range of from 10:1 to 100:1. These fibers of calcium sulfate hemihydrate are clearly distinguishable from the short, broad crystals of hemihydrate, which generally have aspect ratios of 3:1 or less.

DETAILED DESCRIPTION AND PREFERRED EMBODIMENTS

The invention herein is a process for the formation of fibrous calcium sulfate hemihydrate. The invention also encompasses organic polymeric materials reinforced with fibers of the fibrous calcium sulfate hemihydrate. By the process of this invention, fibrous hemihydrate may be produced to the virtual exclusion of nonfibrous hemihydrate and/or calcium sulfate anhydrite. The fibers produced by the process of this invention serve as excellent reinforcing agents for organic polymeric matrices, significantly increasing the strength thereof.

The process of this invention is a process for the formation of fibrous calcium sulfate hemihydrate, the fibers thereof having an overall average length in the range of from 30 to 70 microns, individual maximum lengths not exceeding 180 microns, and aspect ratios in the range of from 10:1 to 100:1; which comprises forming an aqueous suspension of gypsum, said suspension being not greater than 0.30M in gypsum, and said gypsum prior to dispersion being in the form of particles at least 90% of which are minus 2 mesh in size; and converting the gypsum in said suspension to said fibrous hemihydrate by reaction in a pressure vessel in the presence of saturated steam at a temperature in the range of from 120° to 155°C for a period of 0.5 to 2.5 hours, thereby forming fibers of calcium sulfate hemihydrate having an overall average length in the range of from 30 to 70 microns, individual maximum lengths generally not exceeding 180 microns, and aspect ratios in the range of from 10:1 to 100:1.

In the process herein, a specified form of fibrous calcium silicate hemihydrate is formed from gypsum. The process is carried out in a conventional pressure vessel (such as an autoclave) which is preferably equipped with means for stirring the aqueous suspension of gypsum. The pressure vessel also is equipped with means for supplying saturated steam to the autoclave in order to maintain the proper temperature and pressure within the vessel.

In the pressure vessel, the temperature during the reaction period is maintained in the range of 120° to 155°C, preferably in the range of 125° to 140°C. Since this temperature represents the temperature of saturated steam, there will be associated the pressure of the saturated steam at the given temperature. Consequently, the attendant steam pressure will be approximately 29 to 79 psia, preferably about 33 to 52 psia.

The basic raw material used in the process of this invention is gypsum, calcium sulfate dihydrate. The gypsum used herein may be pure or substantially pure gypsum or it may be a commercial grade containing a small amount of impurities (such as calcite) which do not significantly affect the formation of the fibrous hemihydrate. Best results are obtained when the gypsum is ground, crushed, or otherwise comminuted to a particulate form in which at least 90% of the particles are of minus 4 mesh in size. Preferably approximately 80% of the particles will be minus 60 mesh in size. The comminuted gypsum is then dispersed in water to form an aqueous slurry which has a concentration not greater than 0.30M in gypsum and preferably not greater than 0.26M. At greater concentrations, the slurry has been found to be too thick to produce a uniform degree of formation of the fibrous hemihydrate. For instance, hemihydrate fiber reaction products formed from suspensions of 0.35M and 1.17M in gypsum have been found to contain unduly large amounts of nonfibrous materials.

The dispersion may also contain a small amount of a crystal habit modifier which is suitable for the formation of the fibrous hemihydrate. While the prior art lists numerous crystal habit modifiers, it will be found that most of these act to discourage the formation of fibrous hemihydrate and to encourage the formation of the broad crystals. Such materials are to be avoided. There are, however, a number of materials which act to encourage the formation of the fibrous materials. These are generally acids such as boric, succinc, adipic, malonic, sebacic, and similar acids or their salts, as well as salts such as sodium chloride, sodium sulfate, aluminum sulfate, and zinc sulfate. Preferred among these is boric acid. The crystal habit modifier will be present in an amount of from 0.1 to 5 weight percent, preferably 0.25 to 1.5 percent.

As noted above, the pressure vessel in which the reaction is carried out should be equipped with means for stirring or otherwise mildly agitating the gypsum slurry during the reaction. Such stirring may be continuous or intermittent throughout the reaction period.

Reaction time will be in the range of 0.5 to 2.5 hours, preferably 0.75 to 2 hours. Reaction times will be inversely related to the temperature in most cases, with longer reaction times necessary for complete conversion to the fibrous hemihydrate at the lower reaction temperatures. When the reaction continues for periods longer than 2.5 hours, the hemihydrate tends to further dehydrate to anhydrite.

The following examples will illustrate the process of this invention.

EXAMPLE 1

A commercial gypsum containing a minimum calcium sulfate content of 64.5% and being in particulate form in which 98% of the particles were of minus 20 mesh in size, was suspended in water to form a 0.6M suspension. The suspension also contained 0.5 weight percent of boric acid. On reaction for 60 minutes in the presence of saturated steam at 120°C a slurry was formed containing principally fibrous hemhydrate with a small amount of unreacted gypsum still present. The fibrous hemihydrate had individual fiber lengths in the range of from 20 to 180 microns with an average fiber length of 70 microns. The reaction was carried on under laboratory conditions in a commercial kitchen pressure cooker having a 1 gallon capacity. During the reaction period, the pressure cooker was occasionally shaken by hand to agitate the slurry inside.

EXAMPLE 2

The reaction conditions of Example 1 were duplicated, with the exception that the reaction was allowed to continue for 120 minutes. At the end of this period the product was essentially all fibrous hemihydrate with the same size fibers as in Example 1.

EXAMPLE 3

A gypsum slurry with a concentration of 0.23M was formed by suspending the same commercial gypsum as in Example 1 in water. To this slurry was added 1 weight percent of boric acid. The slurry was then reacted in a one gallon stainless steel autoclave equipped with a stirrer for 90 minutes at a temperature in the range of 125° to 140°C. Continuous agitation was provided by the stirrer rotating at 300 rpm. The reaction product was almost entirely fibrous hemihydrate; the fibers were of 10 to 90 microns in length with an average length of 40 microns.

EXAMPLE 4

The experiment of Example 3 was repeated using an average temperature of about 135°C and continuing the reaction for 80 minutes. The resulting product was essentially all fibrous hemihydrate. Fiber lengths were in the range of 10 to 70 microns with an average length of 30 microns.

EXAMPLE 5

The experiment of Example 4 was repeated with the reaction continuing for 120 minutes. The resulting product was essentially all fibrous hemihydrate. Fiber lengths were in the range of 10 to 120 microns with an average length of 30 microns.

EXAMPLE 6

The experiment of Example 5 was repeated with the same reaction conditions. The product obtained was essentially all fibrous alpha hemihydrate. Fiber lengths were in the range of 10 to 100 microns with an average length of 40 microns.

EXAMPLE 7

The experiment of Example 5 was again repeated with the reaction being run for 130 minutes. The product obtained was generally fibrous hemihydrate with a small amount of gypsum present. Hemihydrate fiber lengths were in the range of 10 to 70 microns with an average length of 35 microns.

EXAMPLE 8

A slurry as in Example 5 was reacted at an average temperature of about 145°C for 100 minutes in the same autoclave. The product obtained was essentially all fibrous hemihydrate. Fiber lengths were in the range of 10 to 100 microns with an average length of 40 microns.

EXAMPLE 9

The experiment of Example 8 was repeated under the same reaction conditions. The product obtained was essentially all fibrous hemihydrate. Fiber lengths were in the range of 10 to 80 microns with an average length of 30 microns.

The invention herein also contemplates the incorporation of the fibrous hemihydrate into organic polymeric resin matrices. A wide variety of organic resins are suitable as matrices which can be reinforced by the fibrous hemihydrate. These include polyesters, polyolefins such as polyethylene and polypropylene, poly(vinyl halides) such as poly(vinyl chloride), and polystyrene. The weight ratio of polymeric resin to fibrous hemihydrate will be in the range of from about 2:1 to about 12:1, preferably 2:1 to 6:1. If desired, the polymeric matrix can be extended by addition of up to about 50% of filler. Also included may be small amounts of conventional stabilizers, antioxidants, pigments, etc., used in such polymeric matrices.

The following examples will illustrate the reinforced products of this invention.

EXAMPLE 10

A 200 gram premix containing 14% of the fibrous hemihydrate produced in Example 5 above, 36% of a commercial polyester resin with a diethylaniline promoter and a benzolperoxide catalyst (as a 50% concentrate paste) added, and 50% of calcite filler was blended for 15 minutes. The mixture was heated for 1 minute at 250°C and then pressed under 40,000 psi for 5 minutes to form a sheet measuring 4 × 4½ × ⅛ inches. The composite material was found to have an impact strength of 0.38 ft-lb/in (notched) and 0.43 ft-lb/in (unnotched), approximately comparable to a similar polyester reinforced with grade 7 chrysotile asbestos fiber.

EXAMPLE 11

In an alternative method of preparation 200 grams of the polyester resin of Example 10 was blended at 75°F with 20 grams of fiber as produced in Example 7 above. No calcite filler was added. The mixture was then poured into molds of 8 × ¾ × ¼ inch in size and allowed to set in air for 1½ hours, followed by oven curing for one hour at 250°C. The material so prepared had a tensile strength of 5635 psi, considerably greater than either an unreinforced polyester or a polyester reinforced with grade 7 chrysotile asbestos fiber.

EXAMPLE 12

An 80:20 weight ratio mixture of polyethylene resin and the fibrous hemihydrate prepared as in Example 4 above was compounded at 400°F for about 5 minutes. The material was then cooled, remelted at 450°F and pressed under a 40,000 psi load for 5 minutes to a sheet of the same size as in Example 10 above. This material was found to have a flexural modulus of rupture of 5,200 psi and a stiffness modulus of elasticity of 300,000 psi. These values are comparable to those of polyethylene reinforced with grade 7 chrysotile asbestos fiber, and are considerably superior to corresponding values of unreinforced polyethylene.

EXAMPLE 13

An 85:15 weight ratio composite of polypropylene resin and the fibrous hemihydrate prepared in Example 9 above was compounded, heated, and formed into a sheet 100 mils thick as in Example 12 above. The properties of this material were comparable to those of polypropylene reinforced with grade 7 chrysotile asbestos fiber.

EXAMPLE 14

A composite was prepared containing 90.9% poly(vinyl chloride) and 9.1% of the fibrous alpha hemihydrate prepared in Example 5 above. A small amount of a stabilizer for the poly(vinyl chloride) was added during mixing at low speed. Thereafter, the blend was mixed at high speed until temperature of 240°F was reached by friction. The heated composite was cooled and fused into sheets of 15 to 20 mils thickness which were then passed into a 9 × 9 × ⅛ inch sheet in a frame mold. The resulting material was found to have a notched izod impact strength of 1.08 ft-lbs/in, considerably better than a similar poly(vinyl chloride) composite reinforced with the same amount of grade 6 chrysotile asbestos fiber.

What we claim is:

1. A process for the formation of fibrous calcium sulfate hemihydrate, the fibers thereof having an overall average length in the range of from 30 to 70 microns, individual maximum lengths not exceeding 180 microns, and aspect ratios in the range of from 10:1 to 100:1; which comprises:
    a. forming an aqueous suspension of gypsum, said suspension being not greater than 0.30 molar in gypsum, and said gypsum prior to dispersion being in the form of particles at least 90% of which are at least minus 4 mesh in size; and
    (b) converting the gypsum in said suspension to said fibrous hemihydrate by reaction in a pressure vessel in the presence of saturated steam at a temperature in the range of from 125° to 140°C for a period of 0.5 to 2.5 hours, thereby forming fibers of calcium sulfate hemihydrate having the aforesaid dimensions.

2. The process of claim 1 wherein said aqueous suspension of gypsum has a concentration not greater than 0.26 molar in gypsum.

3. The process of claim 1 wherein the reaction time in step (b) is a period of from 0.75 to 2.0 hours.

4. The process of claim 1 wherein said aqueous suspension also contains a crystal habit modifier suitable for formation of said fibrous hemihydrate.

5. The process of claim 4 wherein said crystal habit modifier is present in an amount of from 0.1 to 5 weight percent of said suspension.

6. The process of claim 5 wherein said crystal habit modifier is boric acid.

* * * * *